United States Patent Office 3,392,314
Patented July 9, 1968

3,392,314
CONTROL SYSTEMS FOR MOVABLE MACHINE STRUCTURE, PARTICULARLY IN MACHINE TOOLS
Siegfried Waller, Erlangen, Germany, assignor to Siemens Aktiengesellschaft, Munich, Germany, a corporation of Germany
Filed May 28, 1964, Ser. No. 371,069
Claims priority, application Germany, May 28, 1963, S 85,398, S 85,400
9 Claims. (Cl. 318—18)

ABSTRACT OF THE DISCLOSURE

A control system for movable machine structure includes a resolver group which provides an induced pilot voltage whose phase position is indicative of the travel position of the structure. A time encoder has a clock pulse source. A pilot counter is connected to the clock pulse source and to the resolver group for counting the clock pulses from each zero passage of the excitation voltage and the resolver group to the next zero passage of the pilot voltage. The pilot counter is inactive just prior to each zero passage of the excitation voltage and is active for an applied counting frequency beginning with the zero passage of the excitation voltage and is inactive beginning with the zero passage of the pilot voltage. A presetting counter is connected to the pilot counter and provides the complementary value to a determined magnitude of a count provided by the pilot counter and presets the pilot counter with the complementary value prior to the provision of the next succeeding count of the pilot counter. A drive control moves the structure and a circuit connects the pilot counter to the drive control to control it in accordance with the count reached by the pilot counter.

---

My invention relates to systems for the control of movable structure in fabricating machinery such as machine tools, and in a more particular aspect to systems involving a digital control performance.

Control systems operating with an incremental travel-measuring graduation are particularly well suitable for the positioning of structures in accordance with chain-type positioning data, i.e. for displacement of the controlled structure relative to a reference point which is not a fixed starting point for all sequential travel steps of the controlled operations but is changed from step to step so that the end point of the preceding travel becomes the reference point for measuring and controlling the amount of travel in the next step of operation. For this purpose, the particular chain-reference value is entered into a counter of the digital control system before the travel of the machine structure to be positioned is initiated. The subsequent machine travel is stopped when the preset counter, controlled by pulses issuing from a travel-responsive transducer or encoder, has counted back to zero. The positioning error occurring with such a control method corresponds to the quantizing error, assuming any coasting or overshooting of the travelling machine structure to remain smaller than one-half of the travel increment, and the total amount of error is independent of the total number of positioning steps.

When an absolute travel measuring system is employed for positioning control on the basis of chain-type measurements, each travel-end point reached by the controlled structure when completing a positioning step, must be employed as a new zero position regardless of any stray values due to coasting. Consequently, with this method the errors due to coasting or overshooting at the end of the individual travel steps become cumulatively effective under most unfavorable conditions. Added thereto is the particular error resulting from the zero compensation of the measuring, i.e. travel transducing or encoding device.

By virtue of their high accuracy, sensors or transducers of the analog type are preferred also for use in otherwise digital control systems because then the interposition of gear or transmission components can be dispensed with, particularly when employing linearly progressing travel-measuring scales. Such analog transducers for issuing pilot signals may be given the design of inductive transducers comprising two primary windings that are 90° spacially displaced from each other and are energized from a generator by two alternating voltages 90° phase displaced from each other so that they jointly produce a field which travels at the energizing frequency and induces in a secondary winding a pilot voltage whose phase varies with the positional relation between the primary and secondary windings. An analog measuring signal formed in this manner can be digitized by time encoding. This is preferably done with the aid of a counter shifted step by step by a clock frequency during a counting interval commencing at each zero passage of the transducer energizing voltage and terminating at the next following zero passage of the pilot voltage supplied from the inductive transducer. The count thus reached is transferred to a pilot memory.

Relating to a digital control system generally of the above-mentioned type, it is an object of my invention to minimize or virtually eliminate the above-mentioned errors that may be due to coasting or overshooting of the controlled structure as it approaches the correct position, and that may become appreciable by their cumulative effect.

Another object of my invention, akin to the one just mentioned, is to make a system of this kind suitable for operation not only in response to adjustable but normally constant reference (datum) values but also for operation with chain-type reference values.

Still another object of my invention is to provide a digital-incremental system for controlling the movable structure of a machine tool or other fabricating machinery in one or more coordinate directions, such as conjointly in x- and y-directions, so as to follow a predetermined path or curvature at a high reliability akin to that of an analog-absolute measuring system.

To achieve these objects and in accordance with a feature of my invention, I provide a positional control system of the above-mentioned type with a presetting register, such as a further counter or storer, which is connected with the pilot counter and permits presetting the pilot counter to a given finite value prior to commencing each individual sensor-response quantizing operation.

According to another feature of the invention, a presetting counter connected with the above-mentioned pilot counter for presetting it to a predetermined count before commencing each measuring operation, is designed as a forward-backward counter and is connected to an interpolator or other function generator which counts pulses of reversed polarity into the presetting counter.

The above-mentioned and further objects, advantages and features of my invention, said features being set forth with particularity in the claims annexed hereto, will be apparent from, and will be mentioned in, the following with reference to embodiments of control systems according to the invention illustrated by way of example in the accompanying drawings, in which:

Figure 1:
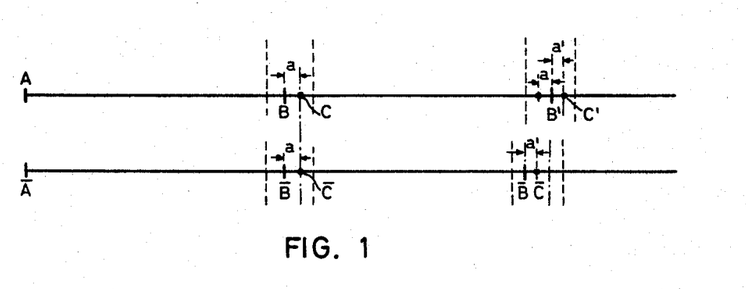
FIG. 1 is an explanatory diagram relating to sequential positioning control operations involving a possibility of positional error which the invention minimizes or eliminates.

The two diagrams presented in FIG. 1 offer a comparison between positional control based upon chain-type measurements with a pilot-reference point (upper diagram), and a corresponding control with a datum-reference point (lower diagram). The term "pilot" is employed in this specification with reference to a value denoting the actual travel position of the structure being controlled, this value being sensed by the travel-responsive sensor or transducer of the control system and quantized by analog-to-digital conversion on a time encoding principle, as well be hereinafter described in detail. The term "datum" relates to the desired positional value which the controlled structure is to reach at the end of its controlled travel, the datum value being set and varied, for example, by a programmer or function generator.

When the machine structure, such as a tool carrier, is started from point A in FIG. 1 and is being controlled to reach the datum point B, the inevitable stray at the termination of the travel, as may be due to coasting, results in an error of the magnitude "a." Hence, the structure may stop at the position $C=B+a$ (upper diagram). Consequently, when operating with chain measurements, the new position C (pilot-reference point) constitutes the starting point for the next control operation which is to bring the structure to the new datum position B'. Due to overshooting, however, the structure does not stop at point B' but reaches the point C'. The distance from the desired position now amounts to $a+a'$, if $a'$ denotes the error in the second operational step. It will be recognized that, when operating with chain measurements and using each time the pilot point as a reference, the coasting errors of the individual steps may become added to one another.

The lower portion of FIG. 1 relates to chain-measurement performance, using the datum point as a reference each time the new travel step is commenced. Consequently, for the second programming step, the datum point $\overline{B}$ and not the pilot point $\overline{C}$ forms the starting point. Accordingly, for the next step, the datum point $\overline{B}$, which is spaced by the error distance $a'$ from the pilot point $\overline{C}$, and not the point $\overline{C}$. It will be seen that the departure from the $n$th positioning point, subsequent to the $n$th chain measurement, is equal only to the quantizing error plus the stray occurring in the last step. This performance is afforded by a control system according to the invention as shown in FIGS. 2 to 8.

The control principle involved will be briefly described with reference to the block diagram of FIG. 2.

The transducer for sensing the displacement of the machine structure to be controlled and for furnishing an analog electric measuring value indicative of the travel position of the structure, is formed by a transformer-type system of induction coils. These comprise an elongated secondary coil 1 stationarily mounted on the machine and having evenly spaced winding turns which constitute a linearly subdivided measuring scale along the travel path of the movable structure. The coil system further comprises a coil pair 2 which is connected with the movable machine structure and is displaceable together therewith so as to constitute a rider that travels lengthwise of the stationary coil 1. The two individual coils of the pair 2 are electrically phase displaced 90° from each other and are energized from an alternating-current generator 3, such as a sine-wave generator, by respective voltages of 90° phase displacement relative to each other. A phase displacement is produced in the illustrated embodiment by means of a phase-shift member 4 which may be composed in the conventional manner of reactive impedances and is interposed between the generator 3 and only one of the two coils of the rider pair 2. The phase-shift member 4 may consist of an RC-bridge, for example.

The transducer 1, 2 operates in principle as a resolver and is commercially available under the trade name "Inductosyn." The circuit connections described above are better apparent from FIG. 3 where the individual coils are shown more in detail. As to further details of such a transducer, reference may be had to U.S. Patent 2,875,390 of R. W. Tripp for Automatic Machine Control System. While a linearly extending "scaling" coil 1 is shown with reference to a linear tool-feed displacement of a machine tool, it should be understood that the secondary or scaling coil 1 may also have a circular axis and the coil pair 2 may travel on a circle about the common center if circular displacements are involved or the linear tool travel is converted to circular displacement of the rider coil group 2. Such circular "Inductosyn" transducers are also known from the above-mentioned patent.

By virtue of the above-described, mutually phase-opposed excitation of the two rider coils 2, a travelling field is produced in the transducer and induces in the scaling coil 1 a sinusoidal voltage whose phase position depends upon the position occupied at a time by the rider 2 relative to the scaling coil 1. The frequency of the generator 3 may be chosen at 2 kc.p.s., for example, and is preferably quartz-stabilized. For this purpose, the sine-wave generator 3 may be synchronized with the aid of a step-down coupling 10 from a quartz-stabilized oscillator 8 which furnishes a voltage of much higher frequency, for example 2 mc.p.s. and serves as a master clock of the control system. The step-down coupling operates in principle as a frequency divider. Suitable frequency dividers are known, for example, from the book, "Pulse and Digital Circuits," by Millman and Taub, 1956, New York, chapter 12. The frequency divider may also comprise a counter which issues an output signal only after each 200th input pulse. The output signal of the frequency-dividing coupling 10 then synchronizes the sine-wave generator 3. Such devices for synchronizing a sine-wave generator by counting pulses are also known from the just-mentioned book, pages 386 to 390.

The scaling coil 1 is connected to a trigger stage 5. A second trigger stage 6 is connected with the sine-wave generator 3. The zero passages of the pilot voltage induced in the scaling coil 1 cause triggering of stage 5, and the zero passages of the energizing voltage from generator 3 cause triggering of the stage 6. The trigger stages 5 and 6 jointly control a coincidence gate stage 7 which is opened when trigger stage 6 is released by the zero passage of the transducer energizing voltage and which is closed by trigger stage 5 in response to each zero passage of the pilot voltage. During those intervals of time in which the gate 7 is open, the clock generator 8 counts a sequence of clock pulses through the gate into a pilot counter 9.

After each counting operation, the value counted by the pilot counter 9 is written into a pilot memory 11 which thus always stores a digital pilot value, corresponding to the instantaneous position of the controlled structure within a cycle period of the pilot voltage induced in the scaling coil 1. The system may be provided with another counter 12 for the coarse counting of the individual pilot-voltage cycle periods. The pilot counter 9 intermittently determines the position of the controlled structure within each travel measuring period by effecting a time encoding operation and transferring the result into the pilot memory 11.

Further provided is a transfer or carry-pulse forming stage 13 which responds to the increase of numerical values written into the pilot memory 11. The carry stage 13 forms a carry signal when passing from zero to 999 or from 999 to zero. This carry signal of the proper polarity is issued to the coarse counter 12 and advances it one step. For example, when employing a scaling coil 1 having a travel cycle period of 2 mm., the pilot memory 11 represents each time the position of the controlled structure within an individual 2 mm.-cycle period, and the coarse counter 12 forms the sum of these cycle periods.

For positioning control on the basis of chain-type measuring operations, the system is provided with an intermediate storer or register for the datum value supplied from a monitor such as a programmer or function generator. This intermediate datum register comprises a fine storer 14 and a coarse storer 15. Connected to the fine storer 14 is a counter 16 by means of which the pilot counter 9 can be preset to a given counting step. Before commencing the first measuring operation, the reference zero point is set by entering into the presetting counter 16 the complementary value of the result stored in the pilot memory 11. This value from counter 16 is thereafter preset into the pilot counter 9 each time a new measuring or control step is to be commenced. As a result, and as long as no further displacement of the controlled structure is initiated, there appears in the pilot memory 11 the value zero as a new measuring value.

The first chain measure for controlling the machine structure is now entered into the intermediate datum storers 14 and 15. The fine storer 14, used for values smaller than 2 mm., is preferably constituted by a counter, whereas the coarse storer 15 is preferably constituted by a storer. After thus the first chain measure is entered into the intermediate datum storers 14, 15, the stored content from coarse storer 15 is transferred into the coarse counter 12. Now the counter 14 is counted down to zero, and the issuing counter pulses are entered with the proper polarity into the presetting counter 16. If during the counting of pulses from counter 14 into the presetting storer 16 a carry-over is necessary, this is taken into account by the operation of the coarse counter 12.

The system is now ready for controlling the feed drive of the machine structure to move it to the proper position, for example with the aid of the means and in the manner described hereinafter with reference to FIG. 3. When the proper position is reached, the next reference value for the second control operation, serving to move the machine structure to a different locality, is entered into the system in the same manner. In each case, the chain measure is referred to the datum reference point $\overline{B}$ as explained above in conjunction with the lower diagram of FIG. 1.

If a pilot reference point ($\overline{C}$ in FIG. 1) is to be chosen for a chain measure, then the new zero-point value is determined and entered into the presetting counter 16 after the machine structure has reached the previously controlled position. Added to the value thus entered into counter 16 is the fine measure from the intermediate storer 14 by counting it additionally into the presetting counter 16.

Figure 2:
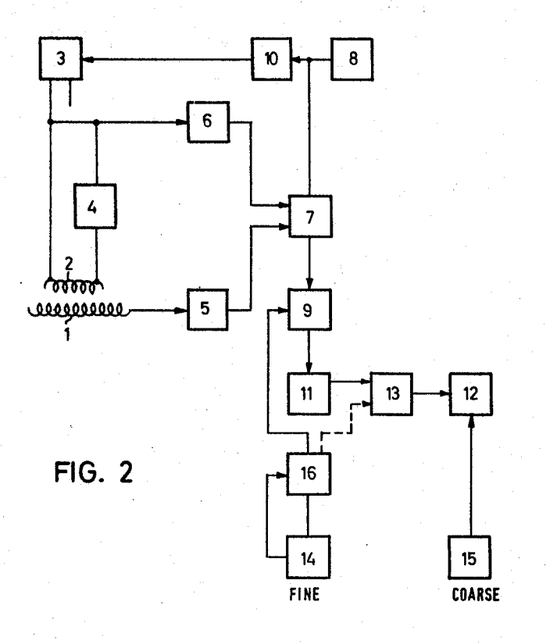
FIG. 2 is an explanatory block diagram of a system for positional control of a machine tool.
Figure 3:
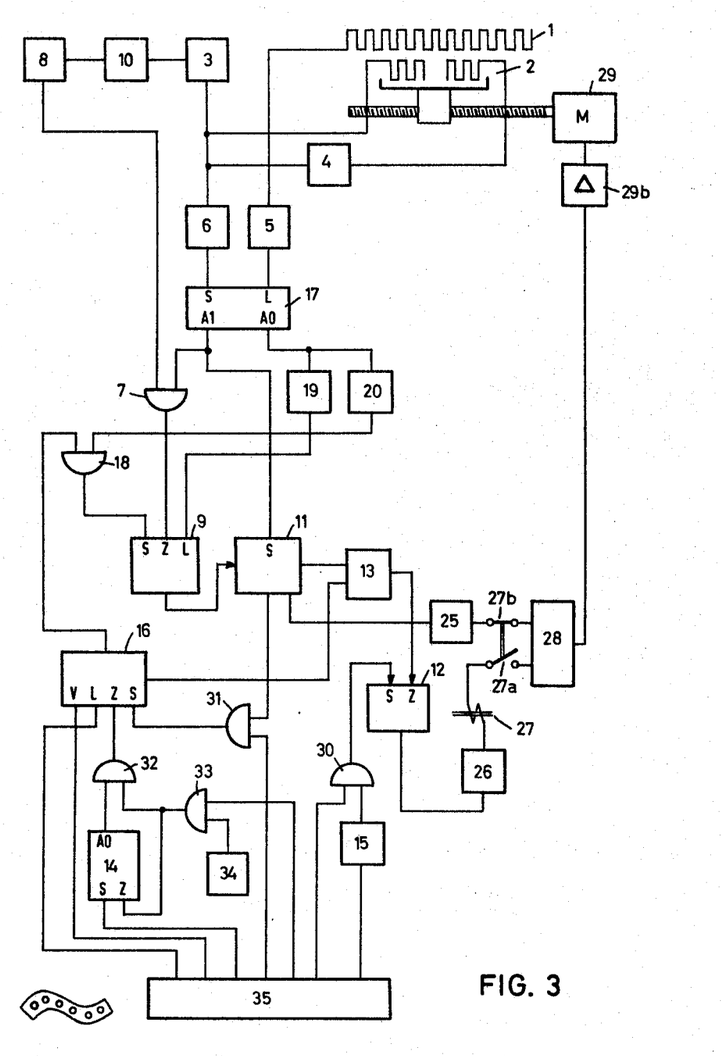
FIG. 3 is a more elaborate circuit diagram of the positional control system of FIG. 2.

The above-described control system of FIG. 1 is incorporated in the more elaborate embodiment represented in FIG. 3 where the same reference characters as in FIG. 2 are applied to corresponding system components respectively.

As shown in FIG. 3, the primary coil pair 2 of the above-described inductive transducer-resolver is mounted on machine structure 2b which is displaceable along the fixed scaling coil 1 by means of a feed screw 2c driven by a reversible motor 29. The motor 29 is controlled through an amplifier 29b by a regulator 28 of the proportional-integral type (PI-regulator). The regulator 28, in turn, is under control by the above-described system components which according to FIG. 3 are more specifically designed and interconnected as follows.

Figure 7:
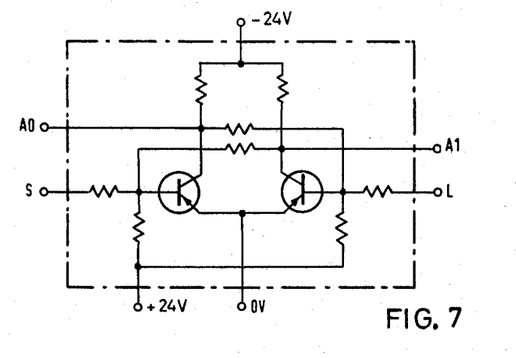

The two trigger stages 5 and 6 connected to the scaling coil 1 and to the sine-wave generator 3 respectively are formed by Schmitt triggers. These have the property of abruptly changing their output voltage when the input voltage attains a given threshold value. Reference for such triggers may be had to the above-mentioned book by Millman and Taub, pages 164 to 173. The output of trigger 6 is connected with the set input S of a memory consisting of a 1-bit storer 17. The trigger 5 is connected with the reset input L of the same storer 17. When a signal appears at the set input S, a signal appears at the output A1 of storer 17; and when a signal appears at the reset input L, a signal appears at the other output A0 of the storer. Such a storer is essentially a bistable multivibrator of which an embodiment is shown in FIG. 7 and described in a later place.

The output A1 is connected with one of the two inputs of an AND gate 7 as well as with the input S of the pilot memory 11. The second input of AND gate 7 is connected to the oscillator 8 (master clock) to receive clock pulses. The output of gate 7 is connected with the counting input Z of the pilot counter 9 whose output is connected with the input S of the pilot memory 11. Connected to the same pilot-memory input is the output A1 of the 1-bit storer 17. The other output A0 of storer 17 is connected to two delay members 19 and 20. Details of the pilot counter 9 and the pilot memory 11 will be described hereinafter with reference to FIGS. 3 and 4.

The pilot counter 9 has a set input S and a reset input L. The value counted by the fine counter (presetting counter) 16 can pass into the set input S of the pilot counter 9 through an AND gate 18. Gate 18 is controlled by the storer 17 through the delay member 20. A signal passing through the reset input L of the pilot counter 9 has the effect of fully clearing the counter. This signal also issues from the storer 17 through the delay member 19.

The transfer stage 13 which serves to form a carry signal, has two inputs connected with the pilot memory 11 and with the presetting fine counter 16 respectively. An embodiment of a suitable transfer member 13 will be described hereinafter with reference to FIG. 8.

The output of the transfer member 13 is connected with the input Z of the coarse counter 12 (counting input Z). The set input S of counter 12 is connected to the output of an AND gate 30 which has two inputs of which one is connected with the output of the coarse storer 15 that forms part of the datum register. The other input of gate 30 is connected with a programmer 35 which furnishes the controlling datum values for monitoring the system in accordance with a predetermined program embodied, for example, in a punch tape fed to the programmer. The output of the coarse counter 12 is connected through a digital-analog converter 26 and a relay 27 with contacts 27a, 27b to the above-mentioned PI-regulator for controlling the feed drive motor 29 of the movable machine structure.

The counting input Z of the presetting fine counter 16 is connected through an AND gate 32 and another AND gate 33 with the output of a pulse generator 34. The AND gate 32 has a second input connected with the fine counter 14 that forms part of the intermediate datum storage register. The content of counter 14 is entered from the programmer 35. The set input S of the presetting counter 16 is connected through an AND gate 31 with the output of the pilot memory 11. Gate 31 is controlled from the programmer 35. The reset input L for clearing the counter 16 and the counting-direction input V of the counter 16 are also connected with the programmer 35 to receive controlling signals therefrom.

The system operates as follows:

The zero passage of the voltage from sine-wave generator 3 controls the trigger 6 to issue an output signal to the set input of the storer 17. This applies voltage to the output A1 of storer 17, thus opening the AND gate 7 so that the oscillator 8 commences counting clock pulses at high frequency into the pilot counter 9. When now the pilot voltage induced in the scaling coil 1, exhibiting a phase displacement relative to the sine voltage of generator 3 in accordance with the positional displacement of the machine structure, passes through zero, the trigger 5 issues a reset signal to the storer 17. Hence the signal now disappears at output A1 and appears at the output A0 of storer 17. The AND gate 7 is closed so that no further clock pulses can reach the pilot counter 9. The number of clock pulses entered into the pilot counter 9 constitutes a measure of the displacement that has taken place between the scaling coil 1 and the rider. After each such counting operation, the content of pilot counter 9 is written into the pilot memory 11. The command for the transfer of the count from counter 9 to memory 11 is issued from output A1 of storer 17. At the moment when the counting operation is terminated and the signal previously available at the output A1 of storer 17 vanishes, the content of counter 9 is passed into the pilot memory 11, and the same signal causes the previous memory content to be cleared.

When the transfer is terminated, the pilot counter 9 is reset to zero. This is done with the aid of the delay member 19 which delays the signal from output A0 of storer 17 by the amount of time required for transfer of the counter content into the pilot memory 11.

A brief review of the system operation thus far described will be helpful before describing further details. As explained, the number of pulses corresponding to the position of the rider relative to the measuring scale is counted into the pilot counter 9. Then this count is written into the pilot memory 11, the counter 9 reset to zero and, each time before a new transfer into the memory 11 is commenced, this memory is likewise reset to zero. In this manner the analog measurement of the positional relation to be controlled is digitized by time encoding in that the pilot counter 9 serves to intermittently determine the position within each individual measuring cycle period or scale division by means of a time measurement and to transfer the result into the pilot memory 11.

As a consequence of preceding operations performed by the fabricating machinery or machine tool being controlled, or also on account of events involved in the attaching of a workpiece to the machine, the absolute measuring system, as a rule, is not set to the zero value when the system commences its control operation. Consequently, the above-described measuring and time encoding system may furnish a finite value into the pilot counter 9 even though the new machining operation to be controlled has not yet commenced. This would make it infeasible to operate a machine-tool control on the basis of chain measurements. It is first necessary, therefore, to establish a new reference zero point that corresponds to the position occupied by the machine structure when it is otherwise ready for commencement of the control operation.

For this purpose, the programmer 35 issues a command for zero-point displacement prior to commencing a new machining operation. This command is constituted by a signal applied to the AND gate 31 with the result of opening this gate. This has the effect that the complementary value of the pilot memory 11 is entered into the presetting counter 16. This value is then preset into the pilot counter 9 before beginning each individual measuring and controlling operation. The presetting value passes from the counter 16 to the pilot counter 9 through the AND gate 18 which is controlled through the delay member 20. In consequence, as long as no displacement of the controlled machine structure has taken place, the number zero appears as a new measuring value in the pilot memory 11. This performance will be briefly elucidated with reference to a numerical example.

Assume the inductive transducer is in such a position that the value 300 is counted into the pilot counter 9. When the gate 7 closes, this count 300 is written into the pilot memory 11 and the counter 9 is cleared. Now the number 300 is contained in the memory 11. The complement of this number relative to 1000, namely the difference 700, is transferred through the AND gate 31 into the presetting counter 16. Thus, the presetting counter 16 is set to 700. Before the AND gate 7 again opens, and hence before commencing another measuring operation, this value 700 is counted through the AND gate 18 and through the set input S into the pilot counter 9. Now the pilot counter 9 is likewise preset to 700. When the AND gate 7 is again opened so that a new measuring operation takes place, 300 pulses corresponding to the position of the measuring transducer are counted into the pilot counter 9. Consequently the counter 9 is now set to a total of 300+700=1000 steps. Since this is the full capacity of the pilot counter, it jumps back to zero when it reaches the 1000 count. As a result, the zero value is transferred into the pilot memory 11. The setting of counter 16 is preset into the pilot counter 9 before each new measuring cycle is started. Consequently there always occurs the value zero as a new measuring value in the pilot memory 11 as long as no movement of the machine structure has taken place.

For controlling the machine structure to move to a new position, the chain measure of the distance to be travelled is entered into the counter 14 and into the coarse storer 15. The setting of the storer 15 corresponds to the setting of the pilot memory which will be described below with reference to FIG. 3. The counter 14 and the coarse storer 15 are both set by the programmer 35 under control by the punch tape mentioned above.

Assume for example that the chain measurement of the distance to be travelled is 4500. Accordingly, the number 500 is entered from the programmer 35 into the counter 14, and the number 4 is entered by the programmer into the coarse storer 15. Then the programmer 35 issues the command for data entry into the fine counter 16 and into the coarse counter 12. This takes place as follows.

The pulse generator 34 is connected through the AND gates 32 and 33 with the counting input Z of the counter 16. The output of the AND gate 33 is also connected with the counting input Z of the counter 14. One of the coincidence conditions for the AND gate 32 is furnished from the counter 14. Assume that the data-entering command causes the AND gate 33 to open. Now, pulses are entered from pulse generator 34 into the two counters 16 and 14. This continues until the gate 32 is closed which occurs when the counter 14 is counted empty, namely when the counter 14 shifts back from its preset value down to the zero value. When the zero value is reached, the AND gate receives no signal from counter 14 and closes. In this manner, therefore, the content of counter 14 is transferred to the counter 16. The counter 16, however, still contains the value 700 stemming from the zero-point displacement mentioned above. The values 700 and 500 in totality amount to 1200. Consequently, only the value 200 remains in counter 16, whereas the carry amount 1 is transferred through the transfer stage 13 to the coarse counter 12. A suitable transfer stage 13 will be described below with reference to FIG. 8.

As mentioned above, the value 4 was entered into the coarse storer 15. This value 4 was issued from the programmer 35 together with the data-entering command through the AND gate 30 into the coarse counter 12. Due to the fact that now a carry-over from the fine counter 16 has taken place, the coarse counter 12 is set to the total amount of 4+1=5. The value 200 remains in counter 16. It will be remembered that the value of the counter 16 is transferred to the pilot counter 9 prior to each measuring operation. Consequently the number 200 is entered into the pilot counter 9. The measuring transducer furnishes the number 300 as described in the foregoing. Consequently the pilot counter 9 is set to a total of 500, and this total is transferred as the pilot value into the pilot memory 11.

Up to this stage, the machine structure has not yet moved. Now the drive motor 29 commences to shift the structure in the direction required to reduce the number counted in the pilot counter 9. When the machine structure has travelled 500 measuring units, the value zero appears in the pilot counter 9 as well as in the pilot memory 11. These 500 units were previously entered into the programmer 35 as constituting the chain measure by which the structure was to be displaced. Consequently when the pilot memory 11 reaches zero, a unit value is carried through the transfer stage 13 to the coarse counter 12 so that the number 5 previously contained therein is reduced to 4. The machine structure therefore continues moving in the same direction until it has passed through the length of four cycle periods. This is achieved by the operation of the transfer stage 13 which responds to the increase in the pilot memory 11. The transfer stage 13 when passing from 0 to 999 or from 999 to 0 forms a carry signal of the correct polarity which is issued to the coarse counter 12. In other words, after the machine structure has been shifted 500 units, the fine value is reached but not yet the coarse value, so that the machine structure continues moving.

The counter then again shows, for example, 900, 800, 700, 600 and so forth. This result is transferred each time into the pilot memory 11. When the pilot counter 9 shows zero, the moving structure has passed through a complete cycle period, comprising 1000 units of travel. This occurrence of zero in pilot memory 11 and the subsequent transfer to 999 is acted upon by the transfer stage 13, and a signal is carried over to the coarse counter 12. When the residual four coarse travel units are used up, the coarse counter is back at zero.

The outputs of the pilot memory 11 and the coarse counter 12 are connected through respective digital-analog converters 25 and 26 with the PI-regulator 28 for controlling the drive motor 29. The regulator furnishes an output signal through the amplifier 29b to the motor 29 and thereby controls the motor as long as a signal is being received either from the counter 12 or the pilot memory 11. During those intervals of time in which the coarse counter 12 exhibits a considerable counted value and hence the machine structure is still far from the desired position, the regulator 28 is controlled exclusively by the coarse counter 12. This is due to the operation of the relay 27 which closes its contact 27a and opens its contact 27b as long as the counting stage in the coarse counter 12 is above a given minimum. Then only the value furnished by the coarse counter 12 can pass through the closed contact 27a to the PI-regulator 28.

When the counting step of the coarse counter 12 passes below a given threshold and hence the machine structure approaches the desired end position, the relay 27 drops off and closes the contact 27b while opening the contact 27a. Now only the fine (vernier) value from the output of the pilot memory 11 is passed to the regulator 28. As the machine structure reaches its predetermined position, this output ceases to furnish voltage so that the motor 29 is stopped. The switching between coarse and vernier control effected with the aid of the relay 27 in the illustrated embodiment, may also be performed without movable contacts by the use of electronic switching components.

If a pilot reference point is to be chosen as a chain-measuring value, then, when the machine structure has reached a previously controlled position, the new zero-point value is determined and entered into the presetting counter 16. Added to this value is then the vernier measure by counting it into the counter 16 from the intermediate storer 14.

Figure 4:
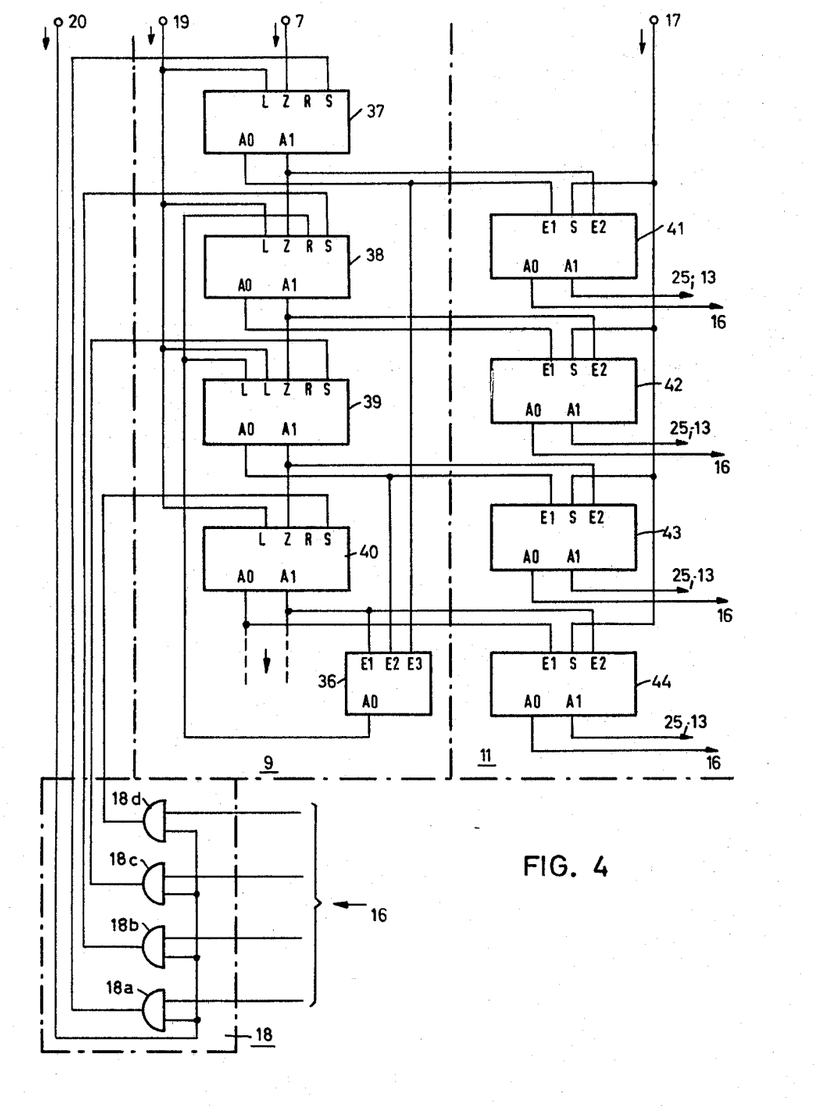
FIG. 4 shows in detail the circuit diagrams of a pilot counter and pilot memory in the system of FIGS. 2 and 3.

An embodiment of the pilot counter 9 and the pilot memory 11 will now be described in detail with reference to FIG. 4. The pilot counter 9 is composed in known manner of binary stages 37, 38, 39 and 40. For simplicity, only one decade is shown. The other decades follow analogously, being connected to the output terminals A1 and A0 of stage 40 as is indicated by broken lines. Such binary-coded decimal counters are known, for example, from the above-mentioned book by Millman and Taub, pages 330 to 334. The operation is as follows:

A counting pulse arriving from the AND gate 7 at the counting input Z of the binary stage 37 produces a signal at the output A1 of the same stage. The output A0 then shows the complementary "0" signal, i.e. no active signal. At the second pulse, the binary stage 37 triggers back to its original position so that the output signal at A1 vanishes and a signal now appears at output A0. The disappearance of the output signal at A1 of stage 37 triggers the binary stage 38 whose counting input Z is connected with the output A1 of stage 37. A signal thus appears at the output A1 of stage 38. When the third pulse is received, a signal again appears at the output A1 of binary stage 37. This, however, does not change the condition of binary stage 38. At the fourth pulse, the output signal at the binary stage 37 again vanishes so that a new counting pulse is issued to the binary stage 38. This eliminates the signal from the output A1 of stage 38.

At the fifteenth pulse, if no feedback provisions are made, all of the four binary stages would exhibit a signal at their respective outputs A1. The sixteenth input pulse would cause all four stages to reset back to zero. However, since such zeroing is to occur after ten pulses, various feedbacks are provided through an inverting (NOR) gate 36 so that at number 9 all four outputs A1 exhibit a signal, and at number 10 all of the four outputs A1 exhibit the signal 0.

Such counters can be preset in any desired manner to a given value. For example, if the number 9 is to be preset in the pilot counter 9 from the presetting counter 16, a signal is applied to all inputs of the AND gates 18a to 18d. When another signal arrives from the delay member 20, a signal is applied to the set inputs S of the respective binary stages 37 to 40. This places all of the binary stages in the condition where the respective outputs A1 supply a signal; that is, the pilot counter 9 now exhibits the value 9. The pilot counter can be cleared just as readily by issuing from the delay member 19 a clearing signal upon all four reset inputs L. This changes all of the binary stages to the condition where no signal appears at the respective outputs A1, while a signal appears at the respective outputs A0.

Each of the above-mentioned binary stages 37 to 40 is a bistable flip-flop such as exemplified in detail by the circuit diagram shown in FIG. 5 and described below.

Figure 5:
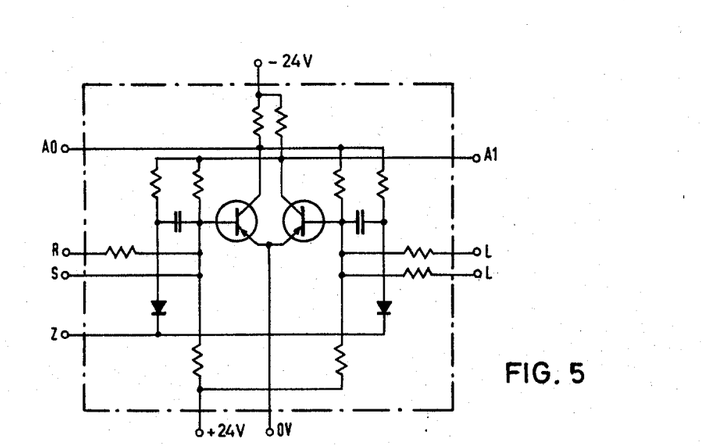
FIGS. 5, 6, 7 and 8 show circuit diagrams of other components of the positional control system.

The memory 11 is composed of a number of register stages 41 to 44 of which one is separately shown in FIG. 5. The transfer of a decimal digit into one of the memory registers is effected upon arrival of a pulse from the 1-bit storer 17 (FIG. 3). The number thus stored in the pilot memory 11 remains preserved in the memory until the memory is set to a different number by receiving a new set pulse from storer 17.

Assume, for example, that the binary stage 37 of pilot counter 9 (FIG. 4) exhibits a signal at output A1 so that the complementary output A0 does not carry a signal. Under these conditions, a signal is applied to the input E2 of the register stage 41, while input E1 does not receive a signal. When the signal at output A1 of storer 17 vanishes, the signals at the inputs E1 and E2 of register stage 41 are shifted to the respective outputs A0 and A1. Consequently, now a signal appears at the output A1 of register stage 41 but no signal at the output A0. The analogous performance is carried otu by the other register stages 42 to 44.

The value counted by the pilot counter 9 can thus be transferred at any time into the pilot memory. To form the complementary value for the presetting counter 16, the latter need only be connected to the outputs A0 of the register stages 41 to 44. The counter 16 can then be set to these complementary values in a simple manner as explained with reference to the pilot counter 9. The outputs A1 of the respective register stages 41 to 44 are connected with the digital-analog converter 25 and the transfer stage 13 that forms the carry signal.

As shown in FIG. 5, each of the binary stages 37 to 40 in the pilot counter 9 is a bistable flip-flop network which can be triggered from one to the other stable conditions under control by signals applied to the inputs R, S, L. The network has an additional input Z which acts upon the two transistors of the network in such a manner that the flip-flop will trigger regardless of which particular condition previously persisted. The negative flank of the input signal acting upon the counting input Z causes this triggering operation. For example, if prior to the arrival of the signal the left transistor is turned off and the right transistor is turned on, the base capacitors are charged to 0 volt at the left and to minus 20 volts at the right. The negative signal on the counting input Z can reach the base of the left transistor only through the left diode and turns this transistor on, the right diode being blocked for this signal because of the prior charging of the capacitor. Due to the internal feedback, the right transistor is turned off, so that the flip-flop now triggers to the complementary condition. The next pulse turns the right transistor on so that the original condition is reestablished. Due to this property, this binary stage operates as a frequency step-down converter for the input pulses having a fixed division ratio of 1:2. With binary stages a division of 1:4 is obtained, with three components the corresponding division ratio of 1:8. This would also permit counting in a binary numerical system which, however, would not be practical for values given in the decimal system. For that reason it is preferable to employ for the pilot counter 9 a decimal-coded binary system, in this case the Aiken code according to which four components afford a total of sixteen combination possibilities of which ten are chosen and are coordinated to the numbers 0 to 9.

Figure 6:
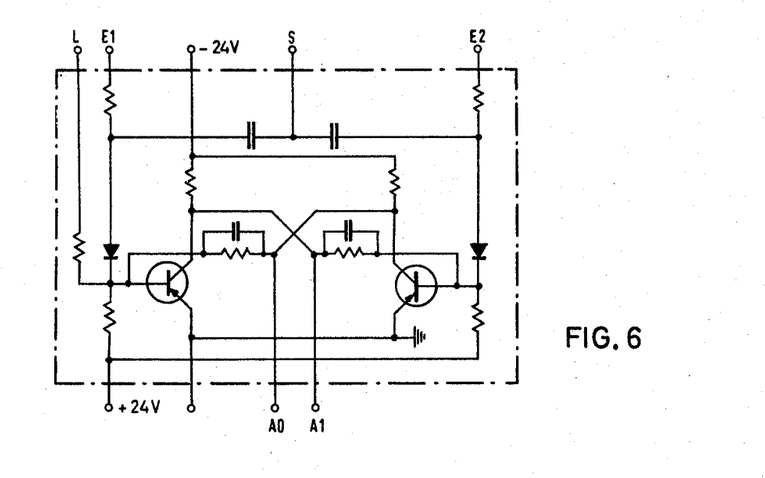

The register stages of the pilot memory 11, 41 to 44, of which one is separately shown in FIG. 6, operate as follows. When a signal appears at input E2 and no signal at input E1, then the output A1 shows a signal and the output A0 no signal when the signal disappears from the set input S. When no signal is applied to input E2 and a signal appears at input E1, then the output A0 shows a signal and output A1 no signal if the signal disappears at the set input S. Consequently, each time the signal at the set input S vanishes, the signals are shifted by the registering stage from the inputs E1 and E2 to the respective outputs A0 and A1.

FIG. 7 shows an embodiment of a 1-bit storer 17 constituted by a bistable flip-flop with two mutually complementary outputs. By feedback connection, the network may assume one of two stable conditions in which the left transistor is turned off and the right one is turned on, or the left transistor is turned on, but the right transistor is turned off. A short pulse supplied to the inputs causes the flip-flop to trigger from one to the other stable condition in which it remains after cessation of the pulse. When a pulse is applied to the set input S, a signal appears at the output A1 and the signal at output A0 vanishes. A pulse applied to the reset input L makes a signal appear at the output A0 whereas the signal at output A1 vanishes.

Figure 8:
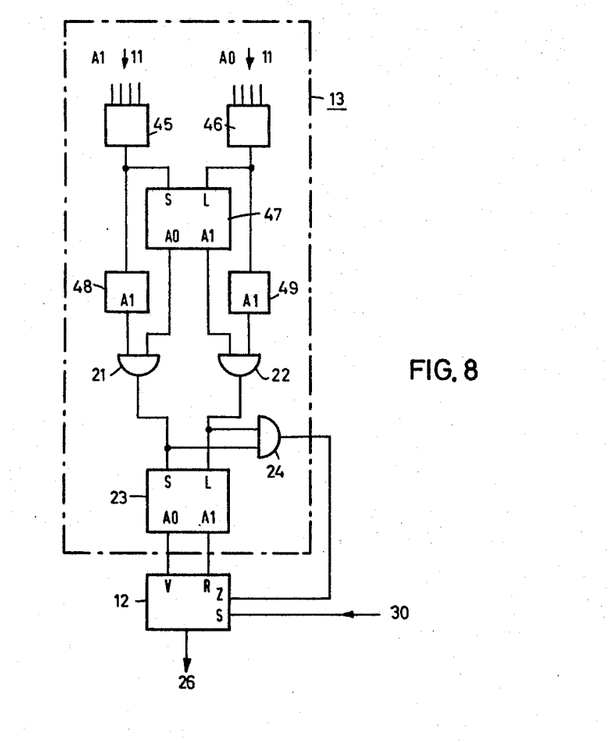

The operation of the transfer stage 13 which forms the carry signal will be explained with reference to FIG. 8. This stage utilizes the increase in the pilot memory 11 and issues a properly polarized carry signal to the coarse counter 12 when the pilot memory 11 passes from 0 to 999 or from 999 to 0. This is tantamount to the fact that when a measuring scale with a travel period of 2 mm. is employed, the pilot memory 11 represents each time the position within the 2 mm. period, and the coarse counter 12 forms the sum of the periods.

Assume, for example, that the number 9 is reached in pilot memory 11 so that all outputs A1 exhibit a signal. Then the concidence condition for the AND gate 45 is met. This sets the memory 47 through the set input S so that a signal appears at the output A1 of memory 47 (which may consist of a 1-bit storer such as the one shown in FIG. 7). Simultaneously a monostable multivibrator 48 is triggered so that it furnishes a one-shot signal at its output A1. Such monostable multivibrators are known, for example, from the above-mentioned book, pages 187 to 199. When now the pilot memory 11 changes to zero, so that all outputs A0 exhibit a signal, the coincidence conditions of the AND gate 46 are met, so that the memory 47 triggers to the other stable condition. The signal at output A1 of storer 47 disappears, whereas now the output A0 exhibits a signal. This opens the AND gate 21 and issues a pulse to the set input S of the storer 23 (which may also correspond to FIG. 7), so that the output A1 of said storer receives a signal and sets the counter 12 to forward counting. If in the pilot memory 11 a transfer from 0 to 9 had occurred, a signal would now appear at the output A0 of the storer 23. This would issue the signal for reverse counting. The counting pulses for the counter 12 are issued through an OR gate 24.

In the control systems actually employed in practice, not only the transfer from 9 to 0 is utilized in this manner, but a larger numerical range, for example a transfer in the range of 950 to 1000 to the range of 0 to 50 or vice versa.

Figure 9:
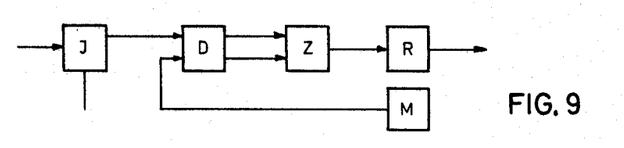
FIGS. 9, 10 and 11 are explanatory block diagrams relating to a modified control system.

A control system according to the invention is also suitable for guiding a tool on a smooth and continuous path of any desired curvature, particularly when the system is modified in accordance with the principles described presently with reference to FIGS. 9 and following.

For continuous-path control of machine tools, the tool must be guided during its machining operation in such a manner that a definite and predetermined mathematical relation, for example $y=f(x)$, is maintained between orthogonal coordinates $x$ and $y$. For simplified programming, the computation of the discrete path points of the tool travel is effected by a function generator, such as a computing interpolator which is supplied with the characteristic incremental values that conjointly denote the geometric shape of the path to be travelled. The internal-type interpolator, preferentially employed for such purposes at the present time, issues a separate sequence of pulses for each of the coordinates, the time spacing between the successive pulses in each sequence corresponding to a fixed increment of travel distance. The time succession of the pulses is so chosen that the desired path travel speed will result.

Such interpolators and other suitable function generators are known, for example, from the contribution by Theodor Erismann entitled, "Digital Differential Analyzers," on page 161 to 211 in the book by Walter Hoffmann, "Digital Information Processors," published by Interscience Publishers, a division of John wiley & sons Inc., New York, 1962.

When using a digital, incrementally operating measuring or trandsucer system at the machine being controlled, the signal-processing components can be given a very simple design. This will be realized from FIG. 9 of the accompanying drawing. The datum pulses caming from an interpolator J and the pilot pulses coming from the digital sensor M are supplied to a difference gate D which forms the pulse difference to constitute a measure of the instantaneous departure from the datum value. The pulse difference is summed up in a difference counter Z. The instantaneous count of the counter Z corresponds to the departure of the pilot position (actual position of the tool) from the datum position and is supplied to a travel regulator R which causes the machine drive to reduce the departure. A corresponding performance is involved with respect to each other coordinate ($y$ or $z$).

Figure 10:
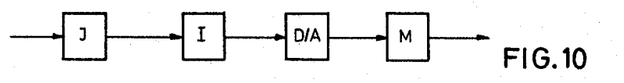

In an analog-absolute or digital-absolute measuring system, the pulses coming from the interpolator J must be summed up in a datum integrator I. In an absolute system corresponding to FIG. 10, the instantaneous condition of the integrator I is converted by a digital-analog converter D/A into an analog value. The positional departure of the tool can then be taken directly from an analog transducer N. In such a measuring system the necessity for digital-analog conversion involves considerable technological difficulties on account of the high switching frequencies.

Figure 11:
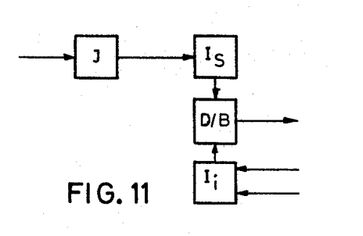

FIG. 11 shows a digital-absolute measuring system in which the interpolator J also issues datum pulses to a datum integrator Is. Denoted by Ii is a pilot integrator and by DB a difference-forming component. In this system, the datum-pilot difference must be continuously computed by difference formation in order to obtain the guiding magnitude for the machine drive with respect to the one coordinate direction here being considered. This requires a considerable amount of equipment.

As mentioned above, a control system according to the invention affords a continuous-path control that permits a relatively simple signal processing akin to that occurring in a digital incremental system but nevertheless possesses the high operational reliability of an analog-absolute measuring system.

Such a continuous-path control system according to the invention is fundamentally designed and operative as described above with reference to FIGS. 2 to 8. That is, the system operates with an inductive transducer operating on the above-mentioned travelling-field principle to serve as an analog measuring device. The analog measuring value thus furnished is converted to a digital magnitude by intermittently determining by time measurement the relative position of the respective primary and secondary windings of the inductive transducer. Such time encoding is preferably effected with the aid of a pilot counter which receives counting pulses from a master clock, the counting being started at each zero passage of the transducer excitation voltage and being stopped at each zero passage to the induced measuring voltage, at which time the count reached by the pilot counter is transferred to a pilot memory. For the purpose of continuous-path control, the pilot counter is connected with a presetting counter which permits presetting the pilot counter to a given value prior to commencing each individual measuring and controlling step, and the presetting counter is designed as a forward-backward counter into which the pulses coming from the above-mentioned interpolator or analogous function generator are counted with reversed polarity.

Figure 12:
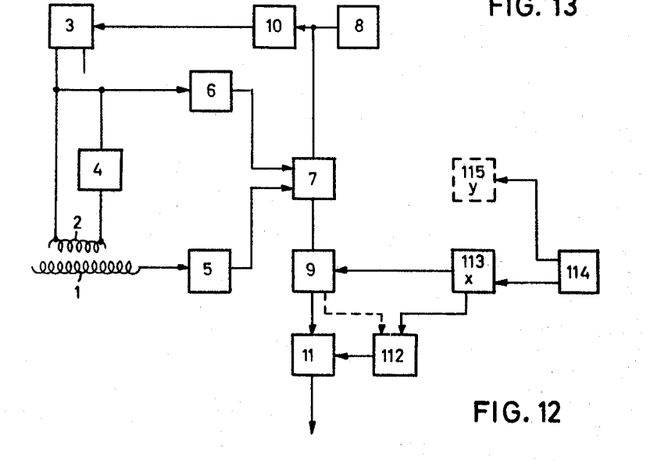
FIG. 12 is a block diagram of the modified system.

The principle of such a control system will be described with reference to FIG. 12. It will be noted that the system according to FIG. 12 is largely identical with the one shown in FIG. 2 and more fully described above in conjunction with FIGS. 3 to 8, with the exception of the modified components denoted by 112 to 115 in FIG. 12. Since in FIGS. 2 and 12 identical reference numerals denote the same components respectively, reference may be had to the description of FIG. 2 relative to the components denoted by 1 through 11. As explained above, the pilot memory 11, at any moment, contains the position of the controlled machine structure and hence of the tool, within an individual 2 mm.-cycle period of the measuring scale represented by the secondary scaling coil 1; and the coarse counter 12, at any time, shows a count indicative of the sum of the cycle periods.

The travel reference point fixed within each individual period of the measuring scale can be displaced from period to period by presetting the pilot counter 9 to a predetermined value before commencing each new counting operation. In the embodiment shown in FIG. 12, such presetting of the pilot counter 9 is effected by means of the presetting counter 113.

Figure 13:
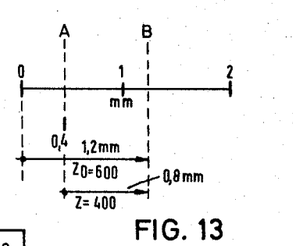
FIG. 13 is an explanatory graph concerning the performance of the system shown in FIG. 12.

This presetting operation will be elucidated with reference to FIG. 13 showing a portion of the measuring scale. For example, the rider 2 (FIG. 12) may occupy the instantaneous position B in FIG. 13. This would correspond to a count of $z_0=600$, corresponding to a distance of 1.2 mm. That is, with an energizing frequency of 2 kHz. furnished from the sine-wave generator 3 and a clock-pulse frequency of 2 mHz. furnished from the oscillator 8, a total of 600 pulses are counted as the tool travels from zero position to position B. Now assume that the position A is to be chosen as a new reference point. The distance $\overline{OA}$ of 0.4 mm. corresponds to 200 pulses. Accordingly, the complementary value, namely 800 pulses, is counted into the presetting counter 113. Consequently, the total counting result of the measurement is 800+600=1400 pulses. However, since the third decade is dispensed with, the 1000 digit is eliminated so that the actual result is 400 pulses=0.8 mm., which corresponds to the desired positioning value.

If now for each new measurement not a fixed presetting is chosen but if the presetting is continually and progressively changed, then the reference zero point becomes displaced in the same manner. This is utilized in the continuous-path control according to the invention.

To this end, the presetting counter 113 is reversible; that is, it is a counting mechanism which will either count forward from lower to higher counts or in the reverse direction from higher to lower counts, depending upon whether the arriving pulses have one of the opposite polarity. The pulses coming from the interpolator 114 are counted into the forward-backward counter 113 with the reverse polarity; and the count contained in the counter 113 each time before a measuring period commences, is transferred into the pilot counter 9. Consequently, the result of the counting operation transferred into the pilot memory 11 constitutes each time the datum-pilot departure which is available for guiding the corresponding tool feed drive in the one coordinate direction here being considered. ($x$-direction as indicated by the symbol "$x$" on the presetting counter 113.) Denoted by 115 is the corresponding reversible counter for the coordinate direction $y$ which also receives pulses from the interpolator 14.

Since the travel-measuring period has a length of only 2 mm. and hence is smaller than the total tool-slider travel, it is necessary when passing beyond the cycle period 999 to 0 or when passing from 0 to 999, to form a carry-over of the correct polarity and to employ it for correcting the guiding signal applied to the tool-feed drive. One way of doing this is exemplified by the circuit diagram shown in FIG. 14.

Figure 14:
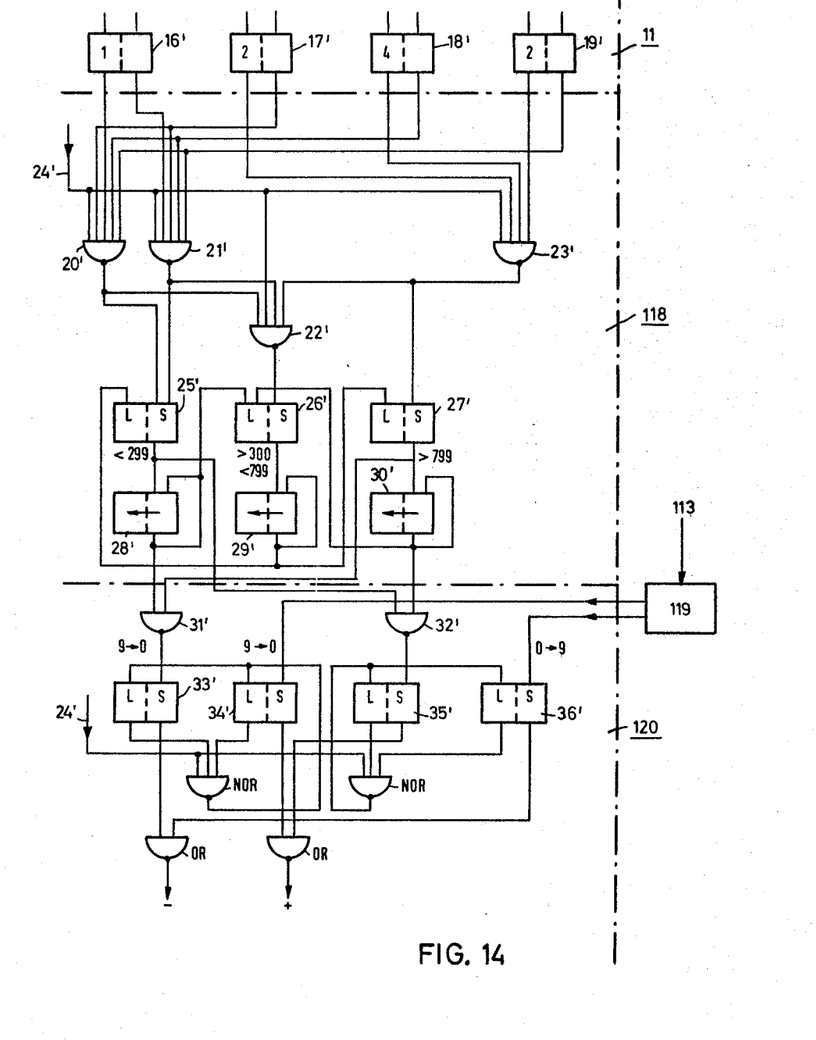
FIG. 14 exemplifies the circuit diagram of a pilot counter in the system of FIG. 12.

FIG. 14 shows only the four binary-coded decimal stages in the third decade of the pilot memory 11 according to FIG. 12. The storers of the respective four stages in the third decade are denoted in FIG. 14 by 16', 17', 18' and 19' which correspond to the respective components 41 to 44 in FIG. 4. The coding corresponds to the Aiken code involving the values 0, 1, 2, 4, 2. The four storers 16' to 19' are connected through NOR gates 20', 21', 22', and 23' with three memories 25', 26' and 27'. For each measuring operation a call-off signal (arriving on line 24') utilizes the storer content in accordance with three ranges (a) below 299, (b) larger than 799, (c) 300 to 799, which content is stored in respective storers 25', 26' and 27'. Connected to these storers are respective one-shot trigger stages 28', 29' and 30'. The storers 25' to 27' (and 33' to 36') may correspond to the one shown in FIG. 7.

When a counting result is in the middle range (storer 26' switched on), the storers 25' and 37' are cleared by the trigger 29'. When the counting result is in the lower range 0–299 (storer 25' switched on) and a zero passage from 0 to 999 takes place, the storer 27' is switched on at the next following measuring operation, and a short signal is issued by the trigger stage 30' to an AND gate 32' which actuates a storer 35'. This storer may consist of a 1-bit storer such as the bistable flip-flop with set and reset inputs. Analogously, the transfer from 999 to 0 causes actuation of a storer 33'. Further storers 34' and 36' are provided for the datum value which are set by a transfer of the counter 113.

Assume that the transfer of the datum value from 9 to 0 takes place (storer 34' set) and that the corresponding pilot transfer from 9 to 0 has not yet taken place (tool-feed drive is lagging), then an OR gate passes a correction signal to the regulator of the drive for correcting the guiding magnitude in the sense required to eliminate the departure of the pilot value from the datum value. As described with reference to the preceding embodiments, the regulation is preferably effected through a digital-analog converter which receives pulses from the pilot memory 11 and effects a corresponding control of the tool-feed motor. The digital-analog converter may consist of a resistance combination. When the above-described carry signal or transfer is positive (+), the regulator preferably switches the drive to an additional current of $10^3$ times the value of the smallest current unit at positive polarity, whereas in the event of a negative (−) transfer, an equally strong current is supplied at the negative polarity, the necessary amplification being provided, for example, by the amplifier 29b (FIG. 3).

Figure 15:
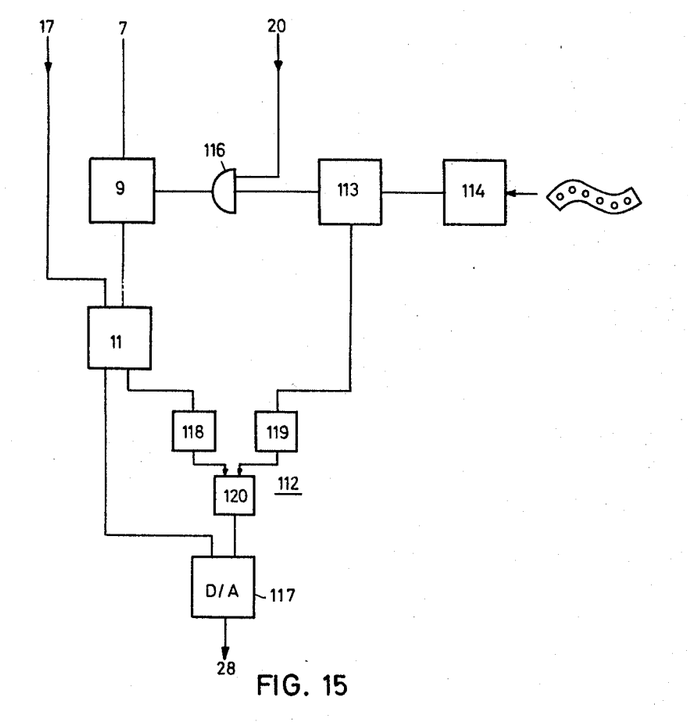
FIG. 15 is a block diagram of a portion of FIG. 12 in greater detail.

The above-mentioned transfer of the count from the presetting counter 113 (FIG. 12) to the pilot counter 9 is effected with the aid of intermediate AND gate 116 as shown more in detail in FIG. 15. The transfer performance takes place in the manner described above for the transfer from counter 16 to counter 9 (FIGS. 2 to 4). The output of the pilot memory 11 (FIG. 15) is connected to a digital-analog converter 117 whose output signal controls the regulator 28 (FIG. 3) for the tool-feed drive. The digital-analog converter 117 has another input connected to a correction stage 112 to receive therefrom a signal for correction of the digital-analog converter output value. The correction stage 112 is composed of two direction-sensing portions 118, 119 and a correction memory 120 (FIGS. 15 and 14).

In a continuous-path control system according to the invention, a coarse counting of the departure between the actual tool position from the datum position can be dispensed with because a departure of more than ±1 mm. can occur only in the event of major trouble in which case a cut-off signal is previously given by the conventional safety devices of such a system.

It will be understood from the foregoing that suitable system components such as counters, storers, gates and memories as well as other circuit components are known as such and their particular design are not essential to the invention proper. Other components than those herein described but serving the same purposes may be employed instead. It will further be obvious to those skilled in the art, upon a study of this disclosure, that the invention permits of various modifications with respect to circuitry and arrangement and hence can be given embodiments other than particularly illustrated and described herein, without departing from the essential features of my invention and within the scope of the claims annexed hereto.

I claim:
1. In a control system for movable machine structure including a resolver group having a source of alternating excitation voltage, an inductive transducer having secondary and primary induction means movable relative to each other in accordance with the travel of the structure to be controlled, said primary means being connected to said source of excitation voltage and said secondary means having an induced pilot voltage whose phase position is indicative of the travel position of said structure, time encoder means having a clock-pulse source; a pilot counter connected to said clock-pulse source and to said resolver group for counting the clock pulses from each zero passage of the excitation voltage to the next zero passage of the pilot voltage, said pilot counter being inactive just prior to each zero passage of said excitation voltage and being active for an applied counting frequency beginning with the zero passage of said excitation voltage and being inactive beginning with the zero passage of the pilot voltage; a presetting counter connected to said pilot counter for presetting it to a given counting step prior to each counting operation, said presetting counter providing the complementary value to a determined magnitude of a count provided by said pilot counter and presetting said pilot counter with said complementary value prior to the provision of the next succeeding count of said pilot counter; drive control means for moving said structure; and circuit means connecting said pilot counter to said control means for controlling it in dependence upon the count reached by said pilot counter.

2. In a control system for movable machine structure comprising an inductive transducer having secondary and primary induction means movable relative to each other in accordance with the travel of the structure to be controlled, and a source of fixed-frequency excitation voltage connected to said primary means whereby said secondary means furnish a pilot voltage whose phase position is indicative of the travel position of said structure, time encoder means having a clock-pulse source; a pilot counter; a coincidence gate network connecting said pilot counter to said two sources and to said transducer secondary means for starting said pilot counter at each zero passage of said excitation voltage and stopping said pilot counter at each zero passage of said pilot voltage; a pilot memory connected to said pilot counter for receiving therefrom the count reached; a presetting counter connected to said pilot counter for presetting it to a given counting step prior to each counting operation, said presetting counter providing the complementary value to a determined magnitude of a count provided by said pilot counter and presetting said pilot counter with said complementary value prior to the provision of the next succeeding count of said pilot counter; drive control means for moving said structure; and digital-analog converter means connecting said pilot memory with said drive control means for controlling it in dependence upon the count reached by said pilot counter.

3. A control system according to claim 2, further comprising a coarse counter and a carry-signal stage connecting said coarse counter to said pilot memory for storing in said memory the position in each measuring cycle period and storing in said coarse counter the sum of the cycle periods.

4. A control system according to claim 2, further comprising resetting means connected to said pilot memory for zeroing it after each control period, and means connected between said pilot memory and said presetting counter for counting into said presetting counter, during resetting of said pilot memory, the complement of the value stored in said pilot memory.

5. A control system according to claim 2, further comprising a programmer for supplying positional datum values, datum register means connected to said programmer to receive the datum values therefrom, and digital comparator means connected to said register means and to said pilot memory for providing a digital output indicative of the datum-pilot departure, said comparator means being interposed between said digital-analog converter means and said drive control means for controlling the latter in accordance with said departure.

6. A control system according to claim 5, wherein said datum register means comprising a fine register formed by a counter and a coarse register formed by a storer, a coarse counter and a carry-signal stage connecting said coarse counter to said pilot memory for storing in said memory the position in each measuring cycle period and storing in said coarse counter the sum of the cycle periods, said coarse register being connected to said coarse counter for setting the latter in accordance with the coarse datum value, and said fine register being connected to said presetting counter for setting it by counting said fine register back to zero.

7. In a control system for movable machine structure comprising a resolver group having a source of alternating excitation voltage, an inductive transducer having secondary and primary induction means movable relative to each other in accordance with the travel of the structure to be controlled, said primary means being connected to said source of excitation voltage and said secondary means having an induced pilot voltage whose phase position is indicative of the travel position of said structure, time encoder means having a clock-pulse source and a pilot counter connected to said clock-pulse source and to said resolver group for counting the clock pulses from each zero passage of the excitation voltage to the next zero passage of the pilot voltage, said pilot counter being inactive just prior to each zero passage of said excitation voltage and being active for an applied counting frequency beginning with the zero passage of said excitation voltage and being inactive beginning with the zero passage of the pilot voltage; a reversible presetting counter connected to said pilot counter for pre-setting it to a given counting step prior to each counting operation, said presetting counter providing the complementary value to a determined magnitude of a count provided by said pilot counter and presetting said pilot counter with said complementary value prior to the provision of the next succeeding count of said pilot counter; a pulse-generating function generator for continuous path control of the machine structure, said function generator being connected to said presetting counter for counting the generated pulses into said presetting counter; and circuit means connecting said pilot counter to said control means for controlling it in dependence upon the count reached by said pilot counter.

8. In a control system for movable machine structure comprising an inductive transducer having secondary and primary induction means movable relative to each other in accordance with the travel of the structure to be controlled, and a source of fixed-frequency excitation voltage connected to said primary means whereby said secondary means furnish a pilot voltage whose phase position is indicative of the travel position of said structure, time encoder means having a clock-pulse source; a pilot counter; a coincidence gate network connecting said pilot counter to said two sources and to said transducer secondary means for starting said pilot counter at each zero passage of said excitation voltage and stopping said pilot counter at each zero passage of said pilot voltage; a pilot memory connected to said pilot counter for receiving therefrom the count reached; a reversible presetting counter connected to said pilot counter for presetting it to a given counting step prior to each counting operation, said presetting counter providing the complementary value to a determined magnitude of a count provided by said pilot counter and presetting said pilot counter with said complementary value prior to the provision of the next succeeding count of said pilot counter; an interpolator for issuing continuous-path control pulses, said interpolator being connected to said presetting counter for counting the path control pulses into said presetting counter; drive control means for moving said structure; and digital-analog converter means connecting said pilot memory with said drive control means for controlling it in dependence upon the count reached by said pilot counter.

9. In a control system according to claim 8, said pilot memory having three memory stages corresponding to consecutively graduated numerical ranges, and having discriminating means connected to said stages for producing a carry signal when the count being entered into the pilot memory passes from one to another of said ranges, said signal being indicative of the counting direction.

References Cited
UNITED STATES PATENTS

| | | |
|---|---|---|
| 2,953,773 | 9/1960 | Nicolantonio. |
| 3,093,781 | 6/1963 | Anke et al. |
| 3,098,187 | 7/1963 | Sciaky. |
| 3,117,263 | 1/1964 | MacDonald. |
| 3,211,976 | 10/1965 | Brule et al. |
| 3,223,830 | 12/1965 | Evans. |
| 3,308,360 | 3/1967 | Vanderbilt. |

BENJAMIN DOBECK, *Primary Examiner.*

G. SIMMONS, *Assistant Examiner.*